H. P. MEAD & D. GRAHAM.
Steam-Generator.
No. 214,420. Patented April 15, 1879.
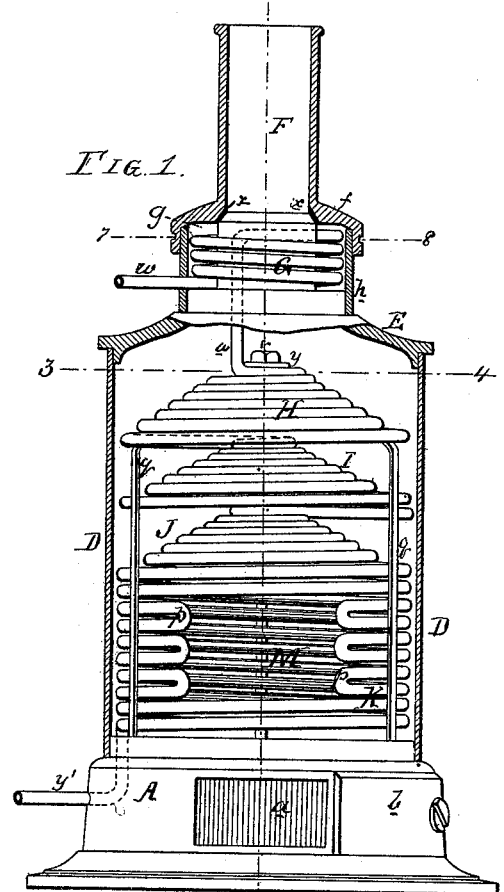
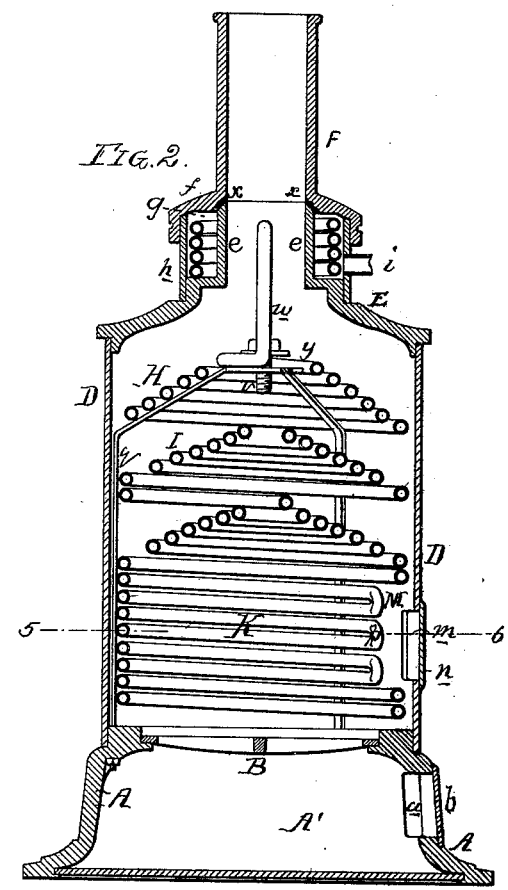
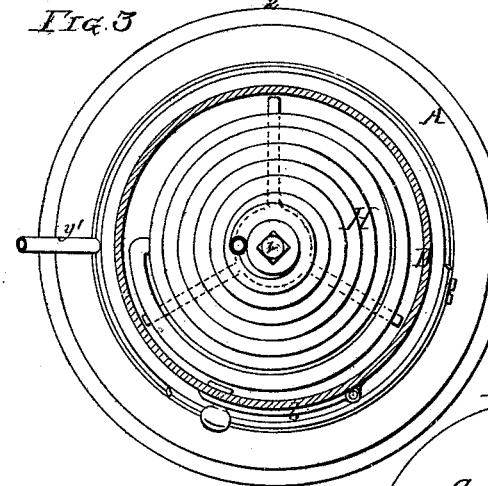
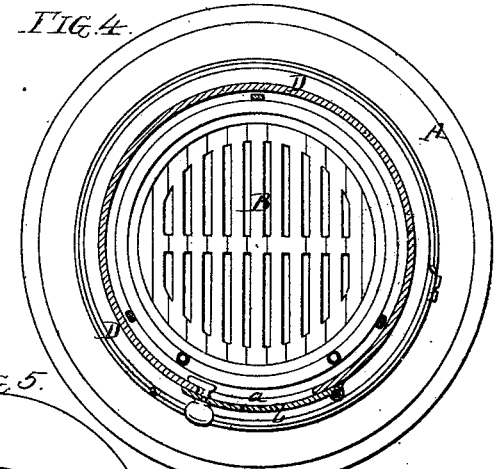
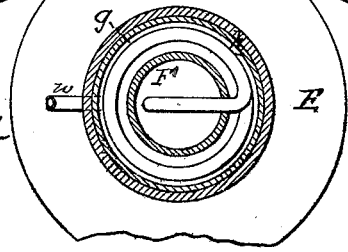
Witnesses
Henry Howson Jr.
Harry Smith
Inventors
Hezekiah P. Mead
and
Dwight Graham
by their Attorneys
Howson & Son

UNITED STATES PATENT OFFICE.

HEZEKIAH P. MEAD AND DWIGHT GRAHAM, OF MORRISVILLE, NEW YORK.

IMPROVEMENT IN STEAM-GENERATORS.

Specification forming part of Letters Patent No. 214,420, dated April 15, 1879; application filed February 4, 1879.

*To all whom it may concern:*

Be it known that we, HEZEKIAH P. MEAD and DWIGHT GRAHAM, of Morrisville, Madison county, New York, have invented a new and useful Improvement in Steam-Generators, of which the following is a specification.

The object of our invention is to construct an effective steam-generator by combining with an outer casing a tube coiled in the peculiar manner fully described hereinafter, with the view of obtaining an extended heating-surface and the best heating effect from the products of combustion.

In the accompanying drawings, Figure 1 is a front view of our improved steam-generator, partly in section, and showing the exterior of the system of coils; Fig. 2, a vertical section on the line 1 2, Fig. 1; Fig. 3, a sectional plan on the line 3 4, Fig. 1; Fig. 4, a sectional plan on the line 5 6, and Fig. 5 a sectional plan on the line 7 8.

The base A of the generator is preferably made of cast-iron, and contains the ash-chamber A', to which access is had through a suitable doorway, which can be opened or closed by means of a sliding or other suitable door, $b$. A grate, B, which may be composed of the usual bars, fits into a recess in the top of the base. The exterior casing, D, of the generator contains the combustion-chamber, and is, in the present instance, of cylindrical form, the lower end of the casing being properly fitted and secured to the base, and the upper end to a cap, E, having a central cylindrical portion, $e$, communicating with the chimney-base F. This base has a flange, $f$, which overlaps and is snugly fitted to the upper portion of a casing, $h$, the lower end being fitted and secured to the cap E.

A chamber, $g$, is formed between the casing $h$ and central cylindrical portion $e$, and to this chamber the exhaust-steam from the engine is admitted through a pipe, $i$, the steam escaping through an annular outlet, $x$, between the upper end of the said central cylindrical portion $e$ and the lower end of the chimney-base F.

The steam-generating portion of the structure consists of one continuous tube, $w$, which first enters the chamber $g$, as shown in Fig. 1, and is contained in the said chamber in the form of a series of coils, G, from which the tube is continued through the central cylindrical portion, $e$, and downward to about the point $y$, where it is continued in the form of a cone-shaped system of coils, H, the lowest convolution of which extends nearly across the chamber formed by the casing D. From the lowest convolution the tube extends to the apex of another conical system of coils, I, the lowest convolution of which extends to the apex of a third system of coils, J, from the lowest convolution of which the tube is continued in the form of a cylindrical system of coils, K, the convolutions of which are all of the same diameter, the coil being near the casing A without being in absolute contact therewith, and extending downward nearly to the grate. This cylindrical system of coils, which may be said to constitute the fire-pot of the generator, is not continuous, however, for there is in the casing D a fuel-opening, $m$, provided with a suitable door, $n$, and there must also be an opening in the set of coils K for admitting the fuel.

The opening $m$ is made without disturbing the continuity of the tube by making abrupt returns $p$ in as many of the convolutions as are necessary to form an opening of the desired size. This will be readily understood by reference to Figs. 1, 2, and 4 without further explanation.

The tube $w$ is continued downward from the cylindrical set of coils into the base, and passes through the same at $y'$.

The several coils are steadied and retained in their proper position laterally by any desired number of rods, $q$, the lower ends of which are secured to the base, the upper ends taking an inclined course beneath the convolutions of the uppermost coils, H, and meeting at a central bolt, $v$, by which they are secured to the apex of the said coil. Water is fed into the upper end of this continuous tube, and is heated in the first instance by traversing the coils G, which are heated by the exhaust-steam in the chamber H, after which the water traverses the systems of coils described above, is therein converted into steam, and finally passes from the generator into a steam drum or separator.

The cylindrical coil K, or the greater portion of it, is exposed to the direct action of the fuel, and the products of combustion are partially arrested by and impinge against the coils J, the convolutions of which, as well as of the other coils, are so far apart that the aggregate area of the spaces between them is sufficient to permit the upward passage of the products of combustion, but contracted enough to cause the said products to impinge against the coils in their haste to reach the uptake F, in which a draft is induced by the exhaust-steam which escapes from the chamber $g$. The upward progress of the products of combustion, after passing the coils J, is partially arrested and dispersed by the coils I, and again by the coils H, before they can escape at the outlet F.

All the systems of coils and every convolution of these systems are subjected to the direct action of the products of combustion, so that there must be very little waste of fuel.

An effective generator may be made by simply combining the fire-place coils K with the first system of coils, J; but we prefer, in most cases, to use an additional obstructing-coil, I, or two or more of such coils.

While it is not essential to our invention that the conical arrangement of obstructing-coils should be retained, that arrangement is preferred, for the reason that a great length of tubing is contained in each coil, and because the coils will best retain their positions when thus arranged.

An important feature of our invention is the fuel-opening $m$, made in the fire-place coils by the abrupt return of some of the convolutions, as shown in Figs. 1 and 2, for by this arrangement the coils can be continued to the grate, or nearly so, and the lower convolutions are thus subjected to the hottest part of the fuel.

We claim as our invention—

1. The combination, in a steam-generator, of the casing D and its opening $m$ with the system of fire-place coils K, some of the convolutions of which, between the upper and lower convolutions, return abruptly, so as to present an opening, $m$, for the admission of fuel, substantially as set forth.

2. The combination of the cylindrical casing D, the fire-place coils, and one or more systems of coils, H I J, arranged above each other, extending across, or nearly across, the said casing, made of one continuous tube, and having spaces between the convolutions, as set forth.

In testimony whereof we have signed our names to this specification in the presence of two subscribing witnesses.

HEZEKIAH P. MEAD.
DWIGHT GRAHAM.

Witnesses:
WILLIAM P. CLEVELAND,
JAY J. GRAHAM.